(12) United States Patent
Lacaille et al.

(10) Patent No.: US 9,754,429 B2
(45) Date of Patent: Sep. 5, 2017

(54) SYSTEM FOR MONITORING A SET OF COMPONENTS OF A DEVICE

(71) Applicant: SNECMA, Paris (FR)

(72) Inventors: Jerome Lacaille, Rosny Sous Bois (FR); Tsirizo Rabenoro, Paris (FR)

(73) Assignee: SNECMA, Paris (FR)

( * ) Notice: Subject to any disclaimer, the term of this patent is extended or adjusted under 35 U.S.C. 154(b) by 50 days.

(21) Appl. No.: 14/438,129

(22) PCT Filed: Oct. 25, 2013

(86) PCT No.: PCT/FR2013/052553
§ 371 (c)(1),
(2) Date: Apr. 23, 2015

(87) PCT Pub. No.: WO2014/064396
PCT Pub. Date: May 1, 2014

(65) Prior Publication Data
US 2015/0287249 A1 Oct. 8, 2015

(30) Foreign Application Priority Data

Oct. 26, 2012 (FR) ..................................... 12 60230

(51) Int. Cl.
*G07C 5/08* (2006.01)
*G07C 5/00* (2006.01)
(Continued)

(52) U.S. Cl.
CPC ........... *G07C 5/0808* (2013.01); *B64D 45/00* (2013.01); *G05B 23/0251* (2013.01); *G07C 5/006* (2013.01); *B64D 2045/0085* (2013.01)

(58) Field of Classification Search
CPC ...... G07C 5/0808; G07C 5/006; B64D 45/00; B64D 2045/0085; G05B 23/0251
(Continued)

(56) References Cited

U.S. PATENT DOCUMENTS 8,594,903 B2 * 11/2013 Feeney ................... F01D 19/00
123/299
8,838,297 B2 * 9/2014 You .......................... B64G 1/54
701/3
(Continued)

FOREIGN PATENT DOCUMENTS

| FR | 2 931 264 A1 | 11/2009 |
|---|---|---|
| FR | 2 957 170 A1 | 9/2011 |
| WO | WO 2010/076468 A1 | 7/2010 |

OTHER PUBLICATIONS

U.S. Appl. No. 14/506,901, filed Oct. 6, 2014, Gouby et al.
(Continued)

*Primary Examiner* — Nga X Nguyen
(74) *Attorney, Agent, or Firm* — Oblon, McClelland, Maier & Neustadt, L.L.P.

(57) ABSTRACT

A system for monitoring a set of components of a device, including: a detecting system including a set of agents for detecting anomalies, with each agent receiving measurements on physical parameters relating to a sub-set of components of a device and delivering an initial distribution of the probability of an anomaly; an acquiring system which receives feedback information and the initial distributions of the probability of an anomaly from the agents; an emerging system which iteratively emerges current distributions of the probability of an anomaly, with the current distributions of the probability of an anomaly converging towards a set of optimum distributions of the probability of an anomaly; and a synthesizing system which synthesizes optimum distributions of the probability of an anomaly relating to at least one sub-set of interest of components of the device in order to extract the risks of an anomaly specific to the sub-set of interest.

9 Claims, 5 Drawing Sheets

(51) Int. Cl.
*B64D 45/00* (2006.01)
*G05B 23/02* (2006.01)

(58) Field of Classification Search
USPC ............................................. 701/31.1–31.9
See application file for complete search history.

(56) References Cited

U.S. PATENT DOCUMENTS

| | | |
|---|---|---|
| 2004/0034456 A1* | 2/2004 | Felke .................... B64F 5/0045 701/32.9 |
| 2006/0064291 A1 | 3/2006 | Pattipatti et al. |
| 2006/0126608 A1* | 6/2006 | Pereira ................. G05B 13/042 370/360 |
| 2008/0004840 A1 | 1/2008 | Pattipatti et al. |
| 2008/0059839 A1 | 3/2008 | Hamilton et al. |
| 2009/0292951 A1 | 11/2009 | Fournier et al. |
| 2010/0306588 A1 | 12/2010 | Hamilton et al. |
| 2013/0211768 A1 | 8/2013 | Gerez et al. |
| 2013/0325286 A1 | 12/2013 | Lacaille |

OTHER PUBLICATIONS

International Search Report Issued May 14, 2014 in PCT/FR2013/052553 Filed Oct. 25, 2013.
French Search Report Issued Jul. 31, 2013 in Patent Application No. FR 12 60230 Filed Oct. 26, 2012 (with English translation of categories of cited documents).

* cited by examiner

SYSTEM FOR MONITORING A SET OF COMPONENTS OF A DEVICE

TECHNICAL FIELD

This invention relates to the field of systems for monitoring a device such as an engine and more particularly, a system for monitoring a set of aircraft engine components.

PRIOR ART

Monitoring an engine and in particular an aircraft engine is very important for the proper operation of the engine. Different devices are used for monitoring or for detecting an anomaly in order to verify the proper operation of the various components of the engine. There is for example, a monitoring device for analysing the behaviour of the ignition process, another for analysing the trajectory of the gases, another for detecting clogged filters, and another for analysing oil consumption, etc.

All of these detecting and monitoring devices make it possible to improve the safety and the reliability of aircraft engines. In particular, they make it possible to prevent or limit in-flight shutdown (IFSD), reduce flight delays and cancellations (D&C), and more particularly, facilitate the maintenance of the engine by anticipating failures and by identifying faulty or failed components.

The various detecting devices make use of various input data and can be configured differently according to the types of defects that are to be detected. Indeed, the same parameters are not necessarily observed according to the components or sets of components monitored. Likewise, according to the types of defects that are to be detected the same physical magnitudes will not be measured.

The results produced by these detecting devices relating to an engine are probabilities or risks of anomalies associated with information on precision. Since all of the components of the engine are linked together, the detecting devices produce a lot of information simultaneously and it is necessary to be able to sort the information in order to assist the maintenance operators in taking a decision as to removing the engine or repairing it.

However, this requires a large amount of time to analyse and in addition, it is difficult for the experts to make use of all of the data which may be pertinent for the monitoring of the engine.

Furthermore, a high rate of detection generates a high rate of false alarms. As such, a duality is observed between the possibility of having a reduced rate of false alarms and good detection. Reducing the rate of false alarms fatally decreases the rate of detection. However, this rate of false alarms is very important for a monitoring application. Indeed, if a detecting device incorrectly suggests a maintenance operation that is costly by nature, this detecting device will lose all credibility. Moreover, in the field of aeronautics, the designing of devices is extremely reliable, which tends to strongly limit the rate of breakdowns and therefore increase the risk of false alarms.

The object of this invention is to propose a system for monitoring a set of engine components that makes it possible to assist maintenance operators in taking a decision while increasing the rate of detection without increasing the rate of false alarms.

DISCLOSURE OF THE INVENTION

This invention can be extended to any device. As such, it is defined by a system for monitoring a set of components of a device such as an engine, comprising:

means for detecting comprising a set of agents for detecting anomalies, with each of these agents being configured to receive measurements on physical parameters relating to a sub-set of components of a device such as an engine and to deliver an initial distribution of the probability of an anomaly, means for acquiring configured to receive feedback information as well as the initial distributions of the probability of an anomaly coming from said set of agents, means for emerging configured to emerge iteratively current distributions of the probability of an anomaly in line with said feedback information, with said current distributions of the probability of an anomaly converging towards a set of optimum distributions of the probability of an anomaly in accordance with said feedback information, and means for synthesis configured to synthesise optimum distributions of the probability of an anomaly relating to at least one sub-set of interest of components of the device such as an engine in order to extract the risks of an anomaly specific to said sub-set of interest.

As such, the system for monitoring makes it possible to substantially increase the rate of detection while still retaining a low rate of false alarms and makes it possible to sort the results in order to focus on the risks of an anomaly concerning a particular sub-set of components of the device such as an engine. As such, the system makes it possible to detect the elements that have a greater risk and consequently, to facilitate the discernment and the taking of a decision in terms of maintenance operations concerning the sub-set monitored.

Advantageously, the means for emerging comprise:

means for merging configured to create each current or optimum distribution of the probability of an anomaly by merging previous distributions of the probability of an anomaly according to predetermined rules for merging, means for optimisation configured to put into line each initial or current distribution of the probability of an anomaly with the feedback information that corresponds to it, in order to associate an efficiency value to it, and means of management configured to change the set of agents towards an optimum population of agents by creating new agents corresponding to the current and optimum distributions of the probability of an anomaly and by selecting the agents that are the most compliant with the feedback information according to the efficiency values associated with said current and optimum distributions of the probability of an anomaly.

This makes it possible to dynamically modulate the agents for detecting anomalies and to emerge agents that constantly adapt to the most interesting events.

Advantageously, the means for emerging are furthermore configured to associate with each initial, current or optimal distribution of the probability of an anomaly relating to a sub-set of components of the device such as an engine, an implication vector reflecting a contribution of each element of said sub-set on the corresponding distribution of the probability of an anomaly.

This makes it possible to effectively link the probabilities of an anomaly to the various elements of the device such as an engine.

Advantageously, the means for synthesis are configured to synthesise the optimum distributions of the probability of an anomaly relating to said sub-set of interest by weighting the influence of each element of said sub-set of interest according to the corresponding implication vectors.

Advantageously, the predefined rules for merging can be chosen from among the following rules: expert rules, reduction rules, voting rules, business rules, Bayesian rules, and fuzzy logic rules.

This makes it possible to combine different sources of information which as such increases the reliability of the monitoring.

Advantageously, the means for optimisation are furthermore configured to adjust the rules for merging according to the feedback information.

Advantageously, the set of agents or the optimum population of agents is formed by instances of algorithms comprising different choices of measurements, or different processing methods, or different configurations.

Advantageously, the initial distributions of the probability of an anomaly are standardised with respect to the context of the measurements.

Advantageously, the system for monitoring comprises means for assisting in taking decisions which make it possible to determine the maintenance operations according to the risks of anomalies.

Advantageously, said device is an engine and in particular an aircraft engine.

The invention also relates to a method for monitoring a set of components of a device such as an engine, comprising the following steps:
acquiring feedback information as well as initial distributions of the probability of an anomaly coming from a set of agents for detecting anomalies, with each one of said agents being configured to receive measurements on physical parameters relating to a sub-set of components of the device such as an engine before delivering an initial distribution of the probability of an anomaly,
emerging iteratively current distributions of the probability of an anomaly in line with said feedback information, with said current distributions of the probability of an anomaly converging towards a set of optimum distributions of the probability of an anomaly in accordance with said feedback information, and
synthesising optimum distributions of the probability of an anomaly relating to at least one sub-set of interest of components of the device such as an engine in order to extract the risks of an anomaly specific to said sub-set of interest.

DETAILED DISCLOSURE OF PARTICULAR EMBODIMENTS

The principle of the invention is to merge different sources of detecting anomalies on a device such as an engine for automatically and in an optimised manner emerging information that can be discerned and that is useful for taking a decision relating to maintenance operations on the device.

Figure 1:
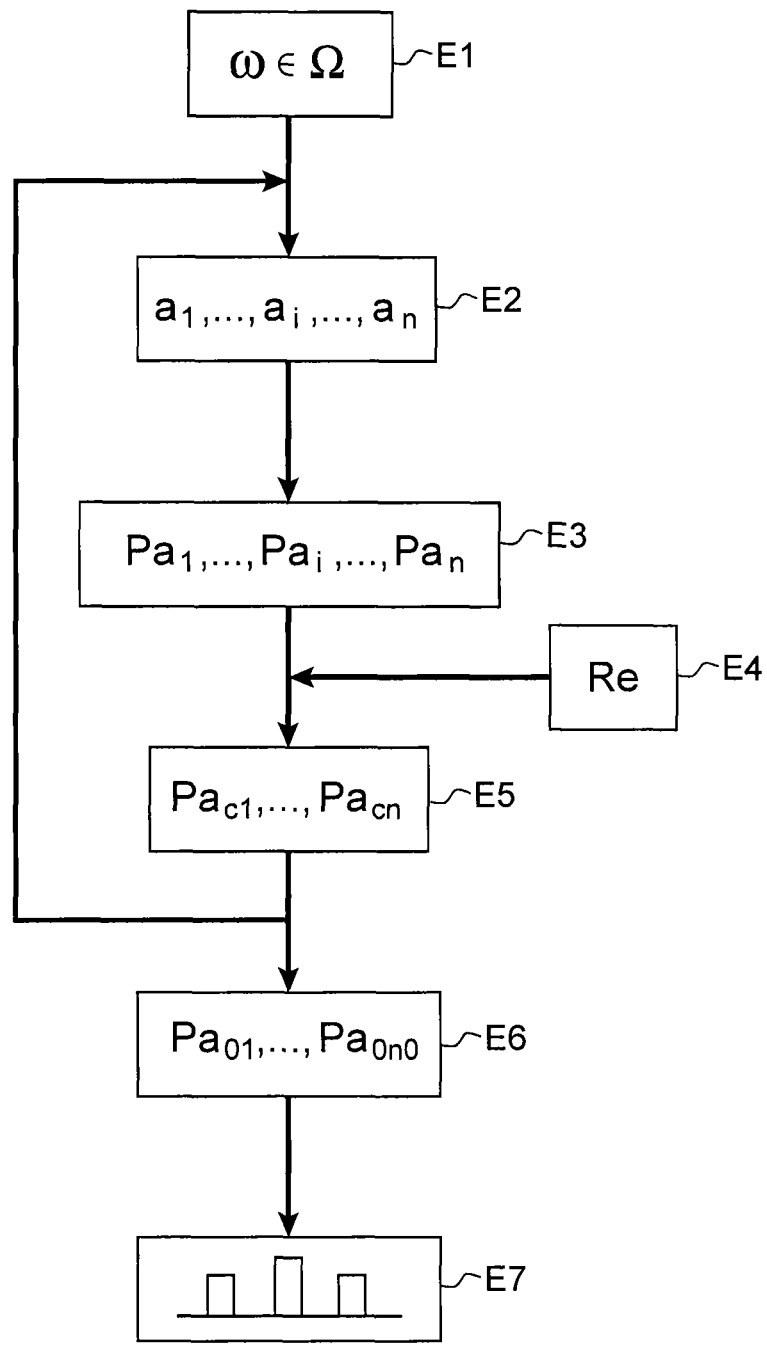
FIG. 1 diagrammatically shows a method for monitoring a set of components of a device such as an engine, according to the invention.

FIG. 1 diagrammatically shows a method for monitoring a set of components of a device such as an engine, according to the invention.

This invention can be generalised to any device in particular a device of an aircraft. "Device" means an engine in particular an aircraft engine, an system for analysing the capacity to start in particular for an aircraft system, a diagnostic confirmation tool, an online system of vibratory analysis, a system for monitoring bearings, a system for identifying missions (workscopes) of the engine during passage in the workshop, a system for automatically identifying the causes of CNR notifications (Customer Notification Report), a system for repairs (troubleshooting), etc.

With a concern for conciseness, the expression "set of components of a device" shall be used in what follows to designate the entire device or a system of the device comprising several components and in particular, the expression "set of engine components" shall be used to designate the entire engine or a system of the engine comprising several components. The expression "sub-set of components of a device" shall also be used to designate a sub-system of the device comprising a single component or several components and in particular, the expression "sub-set of engine components" shall be used in order to designate a sub-system of the engine comprising a single component or several components of the engine.

The method for monitoring according to the invention implements a reasonor which dynamically and in self-adapting fashion mergers information coming from a set of detectors of anomalies, and which then performs a sort and synthesises the merged information.

The step E1 relates to the obtaining of measurements $x(\omega)$ during an experiment $\omega \in \Omega$ on physical parameters relating to a sub-set of components of a device such as an engine.

The step E2 relates to the defining of a set of algorithmic agents $a_1, \ldots, a_i, \ldots, a_n$ for detecting anomalies, with each one of the agents being configured to receive measurements on the physical parameters in order to calculate an initial distribution of the probability of an anomaly.

In the step E3, the set of algorithmic agents $a_1, \ldots, a_i, \ldots, a_n$ deliver a set of initial distributions of the probability of an anomaly $P_{a_1}, \ldots, P_{a_i}, \ldots, P_{a_n}$.

The step E4 relates to the acquisition of feedback information $R_e$ on faults.

The step E5 relates to the use of feedback information as well as the initial distributions of the probability of an anomaly coming from the set of agents for detecting anomalies $a_1, \ldots, a_i, \ldots, a_n$ in order to emerge current distributions of the probability of an anomaly in line with the feedback information.

The current distributions of the probability of an anomaly are created iteratively until they converge in the step E6 to a set of optimum distributions of the probability of an anomaly $$P_{a_{o1}}, \ldots, P_{a_{oi}}, \ldots, P_{a_{on_o}}$$

in accordance with the feedback information.

In the step E7, the optimum distributions of the probability of an anomaly relating to at least one sub-set of interest of components of the device such as an engine are synthesised in order to extract risks of an anomaly that are specific to this sub-set of interest.

Figure 2:
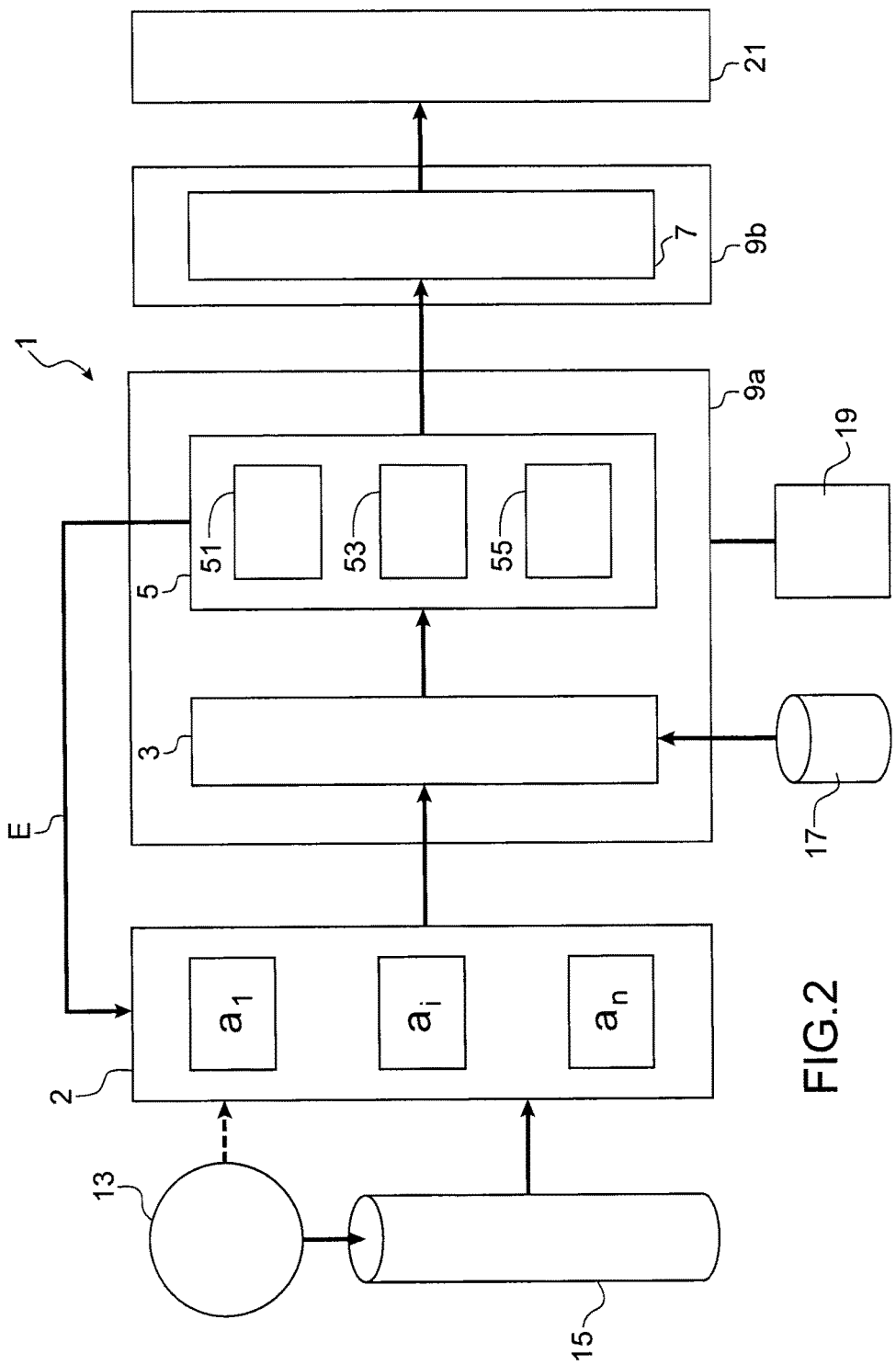
FIG. 2 diagrammatically shows a system for monitoring a set of components of a device such as an engine, according to the invention.

FIG. 2 diagrammatically shows a system for monitoring a set of components of a device such as an engine, according to the invention.

This system for monitoring 1 comprises means for detecting 2, means for acquiring 3, means for emerging 5, and means for synthesis 7.

Note that in the case of an aircraft engine, the means for detecting 2 can be integrated partially or entirely into an onboard calculator for controlling the engine. Moreover the means for acquiring 3, emerging 5 and synthesising 7 are digital modules that can be integrated into the same or into different computers or computer systems 9a, 9b.

The means for detecting 2 comprise a set of algorithmic agents $a_1, \ldots, a_i, \ldots, a_n$ for detecting anomalies which are configured to receive measurements on the physical parameters relating to a sub-set of engine components and to deliver initial distributions of the probability of an anomaly.

An agent $a_i$ for detecting an anomaly comprises algorithmic functions. These functions comprise for example a function for initialising the state of the agent, another for the calibration, other functions for receiving data and the execution of the algorithm and yet others for delivering the results. An agent for detecting an anomaly is generally subjected to a learning phase that includes a calibration procedure. The agents can be launched by the processing means of the calculator or of the computer when this is required. The agent for detecting an anomaly is configured to collect measurements acquired by sensors on the engine 13 and its environment. More particularly, this data can be acquired directly from the engine 13 (dotted arrow) or from an experiment $\omega \in \Omega$ of measurements coming from a database 15.

The agent $a_i$ then calculates using these measurements, indicators that are specific to components of the engine 13 or to logic elements that indicate a specific task for an entire set of components of the engine 13. By way of example, an indicator can correspond to the delay required for a shaft of the engine to reach maximum acceleration after each starting of the engine, another indicator can be the temperature gradient for the exhaust gases of the engine, etc.

However, each measurement can be collected in particular external or internal conditions. These conditions which can have an impact on reading the indicators can be measured and recorded as exogenous data. The external conditions can include outside pressures and temperatures, hygrometry, etc. The internal conditions can concern the specific use of the engine, for example the oil temperature just before the starting of the engine can be considered as contextual data which differentiates two types of starts (cold start or hot start).

As such, these indicators are advantageously standardised, for example via a conventional technique of standardisation according to an average and a standard deviation calculated a priori on a series of previously-digitised data or by other methods identical to those described in patent application WO20100764681 of the Applicant.

Furthermore, the agent can calculate performance or quality indicators that indicate the reliability of the result. These quality indicators can be estimated by known cross-validation statistical models (for example, folding, bootstrap, leave-one-out) described for example in French patent application FR2957170 of the Applicant.

According to a first example, the quality indicator can correspond to an adequacy indicator AQV (Adequacy Quality Value) which defines the measurement of a distance between the input of the agent and an input of calibration defined during the learning of the agent.

According to another example, the quality indicator corresponds to an indicator of robustness MQV (Model Quality Value) that measures a capacity of using the agent in light of new inputs. The indicator of robustness MQV provides information on the operation of the agent in relation to general data and thus indicates what the average quality of the agent should be when new data is applied.

Other examples of quality or performance indicators comprise a probability of false alarms PFA and a rate of detection POD. These indicators can be measured with the maximum of precision desired in light of the volume of data available. Note that it is possible to construct agents of which the PFA is low. The consequence is just that the POD will not be very large. For example, validations on test benches have shown that PODs of 40% to 50% can easily be considered for a PFA less than 1%. It is extremely expensive to dismount an engine for nothing, so, in the field of aeronautics there is certainly focus on a rate of false alarms PFA that is as low as possible.

Finally, the result or the output of an agent $a_i$ consists in a distribution of the probability of an anomaly $P_{a_i}$ that reflects an abnormal behaviour of the component monitored. As such, the distribution of the probability of an anomaly $P_{a_i}$ can be considered as a law of a score of an anomaly $S_{a_i} = S_{a_i}(\omega)$, where $S_{a_i}(\omega)$ is a random variable calculated using data collected from an experiment $\omega \in \Omega$ of measurements coming from the database 15.

This result (i.e. the distribution of the probability of an anomaly $P_{a_i}$) comprises a risk of an anomaly and a measurement of the reliability or of the precision (for example, PFA or POD) of the agent. Indeed, for a predetermined detection or triggering threshold $\theta_{a_i}$ that depends on each agent $a_i$, a risk of an anomaly $R_{a_i}(\theta_{a_i})$ and an associated precision $\sigma_{a_i}(\theta_{a_i})$ can be defined which depend on the detection threshold $\theta_{a_i}$, according to the following formulas:

$$R_{a_i}(\theta_{a_i}) = P(S_{a_i} > \theta_{a_i}) = P_{S_{a_i}}([\theta_{a_i}, +\infty[); \text{ and}$$

$$\sigma_{a_i}(\theta_{a_i}) = \sigma(R_{a_i}(\theta_{a_i})).$$

The precision $\sigma_{a_i}(\theta_{a_i})$ can be defined either by a standard deviation of the risk of an anomaly $R_{a_i}(\theta_{a_i})$, or by a cross validation, or directly by an algorithmic model.

Moreover each one of the agents $a_i$ is configured by a particular configuration $p_{a_i}$ which can correspond to a choice of parameters (for example, a choice of scaling factor), a choice of inputs (for example, time signals or instantaneous "snapshots"), or a time delay, leading to what is commonly referred to as an instance of the algorithm. In an effort to simplify the formulation, it is assumed that all of the agents $a_i$ are different.

As such, each agent $a_i$ is defined according to the choice of the algorithm a, its configuration $p_{a_i}$ and its predetermined detection threshold $\theta_{a_i}$. Each agent can then be noted in the following way: $a_i = (a, p_{a_i}, \theta_{a_i})$.

The means for acquiring 3 are configured to receive the initial distributions of the probability of an anomaly $P_{a_1}, \ldots, P_{a_i}, \ldots, P_{a_n}$ (i.e. the risks of an anomaly $R_{a_1}, \ldots, R_{a_i}, \ldots, R_{a_n}$ and the corresponding precisions $\sigma_{a_1}, \ldots, \sigma_{a_i}, \ldots, \sigma_{a_n}$) coming from the set of agents $a_1, \ldots, a_i, \ldots, a_n$ for detecting anomalies as well as from the feedback information 17.

Feedback is given by an expertise and the associated risk. For example, the feedback for a particular component can be translated by a risk of an anomaly of expertise $R_e$ on a fault defined using an experiment of measurements as well as a confidence that corresponds to the precision that the expert gives to this risk.

The means for emerging 5 then use the feedback information 17 and the initial distributions of the probability of an anomaly $P_{a_1}, \ldots, P_{a_i}, \ldots, P_{a_q}$ coming from the set of agents $a_1, \ldots, a_i, \ldots, a_n$ in order to iteratively emerge current distributions of the probability of an anomaly $$P_{a_{o1}}, \ldots, P_{a_{oi}}, \ldots, P_{a_{on_o}}$$

in line with the feedback information 17. This iterative construction allows the current distributions of the probability of an anomaly to converge towards a set of optimum distributions of the probability of an anomaly $$P_{a_{c1}}, \ldots, P_{a_{ci}}, \ldots, P_{a_{cn_c}}$$

in accordance with the feedback information 16.

The means for emerging 5 use expert merging techniques that emerge pertinent information using the data observed making it possible to substantially improve the rate of detection POD while still retaining a low rate of false alarms PFA. Indeed, the means for emerging 5 will overcome the low rate of detection of an agent $a_i$ via the simultaneous observation of a plurality of agents.

More particularly, the means for emerging 5 comprise functions or means for merging 51, optimising 53, and managing 55.

The means for merging 51 are configured to create each current $P_{a_{ci}}$ or optimum $P_{a_{oi}}$ distribution of the probability of an anomaly by merging preceding distributions of the probability of an anomaly according to predetermined rules for merging. The merging operation is tantamount to combining distributions of the probability of an anomaly (or more particularly, of the risks of an anomaly $R_{a_i}$) that make use of the set of data coming from the set of agents making it possible as such to resolve the problem of the low rate of detection.

As such, the risks of an anomaly $R_{a_1}, \ldots, R_{a_i}, \ldots, R_{a_n}$ can be merged together via reduction operations (for example, an average, a regression, or a neural network) in order to construct a new risk of an anomaly $R_{a_{i'}}$ noted in the following way:

$$R_{a_{i'}} = \Phi_{a_{i'}}(R_{a_1}, R_{a_2}, \ldots, R_{a_n})$$

where $\Phi_{a_{i'}}$ is a merging operation which can be a business rule, Bayesian logic, fuzzy logic, a voting mechanism, or a result of learning.

The risks of a merging anomaly $R_{a_{1'}}, \ldots, R_{a_{i'}}, \ldots, R_{a'_{n'}}$ can also be used as input for other successive merging operations, creating as such an oriented graph:

$$R_{a_{i''}} = \Phi_{a_{i''}}(R_{a_{1'}}, \ldots, R_{a_{i'}}, \ldots, R_{a_{n'}})$$

Manipulating the set of risks of an anomaly must normally take into account the management of the relations in the oriented graph. For example, deleting a risk of an anomaly can result in the deletion of a branch of the graph. Note that in what follows, the distinction will no longer be made between a risk of an anomaly coming from an initial agent or from a merger.

Moreover, the means for optimisation 53 are configured to put into line each initial or current distribution of the probability of an anomaly (i.e., initial or current risks of an anomaly and the corresponding precisions) with the feedback information that corresponds to it, in order to associate an efficiency value to it. For example, the efficiency value can be defined using a distance between a risk of an anomaly $R_{a_i}$ coming from an agent and the risk of an expertise anomaly $R_e$ that corresponds to it. The optimisation as such leads to a constant improvement in the efficiency of the result of the merger with respect to the feedback.

Advantageously, the means for optimisation 53 are furthermore configured to adjust the rules of merging according to the feedback information. Indeed, a projection tool of the regression type on the feedback information can be used to modulate the rules for merging.

Furthermore, the means of management 55 are configured to change the set of agents to an optimum population of agents by creating new agents $a_1, \ldots, a_n, a_1', \ldots, a_i', \ldots, a_n', \ldots, a_i'', \ldots$ corresponding to the current and optimum distributions of the probability of an anomaly and by selecting the agents that are the most compliant with the feedback information. This selection can be based on the efficiency values associated with the current and optimum distributions of the probability of an anomaly. The change in the agents is shown in FIG. 1 by a return arrow E modelling the transfer of the efficiency to the means for detecting 2 thus allowing for an optimisation of the algorithmic agents $a_i = (a, p_{a_i}, \theta_{a_i})$ for a selection of the best algorithms, parameters, configuration or thresholds.

In order to discover an optimum configuration and/or suitable configuration, it is advantageous to use a large number of agents adjusted differently, but which are confronted with one another. A stochastic technique of the "genetic algorithm" type allows these agents to exchange their "points of view" in order to in the end converge towards an increasingly efficient population. The learning depends on the feedback information which is updated on a regular basis by the experts or maintenance operators. Using this information, the agents can be calibrated automatically. Note that a genetic algorithm is suited for increasing the agent population by creating new ones. Recall that agents are algorithmic instances defined by algorithms, configurations, parameter settings, detection (or triggering) thresholds, and delays (for example, a parameter of the agent can consist in taking a past value and not the latest value calculated). As such, the new agents can be created by algorithmic mutation operations by modifying the parameters of an instance, or its triggering threshold. They can also be created by algorithmic cross operations by intelligently mixing the parameters of compatible agents (for example an optimisation of the delay, scale, etc.). Other creations can be carried out by logic mutations by modifying the parameters of the rules of a merger operator or by logic crosses by skillfully combining several merger operators. The new agents can also be created by randomly selecting pairs of agents from the initial set of agents in order to generate child agents.

Then, the means for emerging 5 calculate the efficiency values associated with all of these new agents and carry out a selection pressure so as to retain from the global population only the best while still retaining a coherent graph structure. Note that it is possible to use other methods of optimisation based on interactive tools dedicated to experts.

As such, by managing the set of agents that it will modify as new feedback information arrives, the means of management 55 make it possible to automatically detect new configurations that will not have necessarily been thought of and which adapt better to each current situation. A new configuration can correspond to a new choice of inputs of an agent, new processing parameters of the agent, or a new selection of observations for the calibration of the agent.

Take the example of a new aircraft engine that is to be monitored. The current techniques consist in using a series of algorithms that are predefined and validated by business experts. These algorithms are of transverse use, and they apply to all types of engines, but they are not specialised for this particular engine. Furthermore, there are also detectors of anomalies (of unusual operation) that are entirely generic, but which have a low degree of performance at initialisation as they were generally calibrated for all types of aircraft engines.

However, a new engine, even if it respects the expertise criteria of a document established by the engine experts called FMECA (Failure mode, effects and criticality analysis) which specifies the probability of the occurrence of each failure, will not show a succession of defects that is absolutely generic. The problems encountered will depend on the design of the engine (its manufacture, the lots of the parts, etc.), its operation and the flight conditions encountered. As such, the most likely failures will not necessarily be those indicated generically by the FMECA, but consequences of the environment.

By managing a population of these detectors that are made to change according to a stochastic technique, it is then possible to emerge configurations that are suited not only to this particular engine, but also to construct a complete system capable of adapting over time to the most interesting events. As such, a dynamic and self-adapting application which globally models all of the agents used to diagnose the engine will therefore have much more chance of targeting the most likely degradations.

Finally, the means for synthesis 7 are configured to synthesise optimum distributions of the probability of an anomaly relating to at least one sub-set of interest of engine components in order to extract the risks of an anomaly that are specific to the sub-set of interest. In this way, focus will be placed on the information relating to a particular sub-set of components for assisting in taking decisions concerning the maintenance operations. For example, the optimum distributions of the probability of an anomaly can be synthesised in the form of ladder diagrams that show the risk on each engine component considered.

Advantageously, the means for emerging 5 are furthermore configured to associate to each initial, current or optimum distribution of the probability of an anomaly relating to a sub-set of engine components, an implication vector reflecting the contribution of each element of the sub-set on the corresponding distribution of the probability of an anomaly.

Indeed, the engine 13 or the set of engine components monitored is constituted of sub-sets that at the origin combine physical components, where each one is able to produce certain faults. Each algorithmic agent $a_i$ has a contribution in the monitoring of each one of these faults. It is supposed that the total number of faults f to be monitored is finite and is equal to K. An implications vector $\xi^a$ can then be defined for each distribution of the probability of an anomaly in the following way:

$$\xi^a = (\xi_1^a, \ldots, \xi_f^a \ldots \xi_K^a) \text{ with } \Sigma_f \xi_f^a = 1.$$

The initial implication vector is defined as an input given by the experts for the initial agents (i.e., $\xi^a = \xi^{R_a}$). In what follows, each implication vector is calculated for each merging operation, using a suitable method which can be determined by an expert rule or which can be learned using data. The implication vector can be seen as a probability a priori for the correspondence of the risk of the anomaly for the estimation of a fault on a component.

Note that the implication can of course have an effect on the optimisation or the improvement of the global efficiency of the population of agents. Indeed, the feedback is provided by an expertise e and an associated risk $R_e$ in the form of an expertise implication vector $\xi^e = (\xi_1^e, \ldots \xi_K^e)$. This vector specifies which faults the expertise e covers. For example, an opinion on an experiment $\omega$ of measurements given by an expert and covering a sub-set of particular components for the detection of a well-defined fault f' is weighted by an implication vector of which the coordinates are null except for the coordinate f' which is equal to 1. The expert then examines the measurements $X(\omega)$ (X being the vector of the measurements stored in the database and $x = X(\omega)$ corresponding to a set of values) and provides a response $R_e(\omega)$ that is more or less clear-sided on this fault. For example $R_e(\omega) = 1$ if the expert observes that there is a fault and $R_e(\omega) = 0$ otherwise. In other cases, the expert may be less categorical by proposing an intermediate value as well as a confidence $\sigma_e(\omega)$ that corresponds to the precision that he is giving to his observation. As such, the expert will assist in calibrating the system for monitoring.

Furthermore, the effectiveness of an agent is obtained based on the expertise available according to a distance $d_a$ between the risk $R_a$ coming from the agent and the risks of the expertise $R_e$ which involve the implication vectors $\xi^a$ and the expertise implication vectors $\xi^e$ and the confidence value $\sigma_e$; for example in the following way:

$$d_a^2 = \sum_e \frac{(R_a - R_e)^2}{\sigma_e^2} \xi^a \cdot \xi^e$$

The shorter this distance is, the more efficient the agent is.

This allows the means for synthesis 7 to synthesise the optimum distributions of the probability of an anomaly relating to the sub-set of interest by weighting the influence of each element of the sub-set of interest according to the corresponding implication vectors and the confidence provided to the expertises. Each one of the agents for detecting anomalies can be linked to one or several sub-sets of engine components by the intermediary of data observed or calculated indicators. It is therefore possible to carry out syntheses based on the components monitored.

As such, thanks to the contributions represented by the implications vector associated with each distribution of the probability of an anomaly (or risk of an anomaly), the means for synthesis construct one synthesis per projection on each of the sub-sets of components and/or each of the faults. For example, the following formula is a simple linear projection on a sub-set, a component, or a fault:

$$\bar{R}_\zeta = \sum_{f \in \zeta} \frac{\pi_f^\zeta}{Z_f} \sum_a \xi_f^a R_a \text{ with } Z_f = \sum_a \xi_f^a$$

where $\zeta = \{\text{list of faults to monitor}\}$, $\pi^\zeta = (\pi_1^\zeta, \ldots, \pi_K^\zeta)$ is the vector of the contributions of each fault associated with the sub-set $\zeta$ with $\Sigma_f \pi_f^\zeta = 1$ (which is in general obtained via assumptions provided by the FMECA).

Advantageously, the system for monitoring 1 comprises a man-machine interface 19 that allows experts to provide their opinions during the phases of using the system for monitoring.

Furthermore, the system for monitoring can comprise means for assisting in taking decisions 21 (for example, a tool for locating breakdowns "troubleshooting", specific displays, etc.) which make it possible to determine the maintenance operations according to the risks of anomalies. The means for assisting in taking decisions 21 receive as input the risks of anomalies and the links on the various sub-sets of engine components and deliver as output the maintenance operations to be carried out by taking into account all of the possible operations and their cost.

FIGS. 3A-3D diagrammatically show merging examples in a system for monitoring a set of components of a device such as an aircraft engine, according to the invention.

The database 15 comprises data and measurements concerning an aircraft engine and its environment, received from the aircraft 31.

The means for detecting 2 comprise a set of initial agents for detecting anomalies. Note that in aeronautics, there are a plurality of generic algorithms for detecting anomalies which are not supervised a priori. These generic algorithms can be increased tenfold by adapting them to all types of signals (time, snapshots, etc.) or with different parameters (context, values monitored, scaling factors, etc.), but also with different calibration data. As such, many agents can be implemented to form the set of initial agents for detecting anomalies.

The various agents receive the measurements concerning the engine in order to calculate and deliver as output initial distributions of the probability of an anomaly that define the risks of an anomaly and corresponding quality indicators.

Note that the set of agents receive the data relating to the engine to be monitored in order to detect an anomaly on this engine or on a sub-system of the engine.

However, the agents for detecting an anomaly may have been calibrated using data coming from a fleet of engines. Furthermore, certain agents can for example use the data from two engines of the same aircraft in order to compare these pieces of data together. In addition, certain agents can compare the data of the engine to be monitored with data stored in memory relating to a fleet of engines.

Each example of FIGS. 3A-3D implements several agents (or instances) of one or several algorithms.

The means for emerging 5 receive via the means for acquiring 3, the initial distributions of the probability of an anomaly coming from the set of agents for detecting anomalies. They also have data or expert rules 18 that define the rules for merging and feedback information 17 that make it possible to adjust the rules for merging and which contribute above all in defining the efficiency of the merger.

The means for emerging 5 merge the initial distributions of the probability of an anomaly in order to iteratively emerge current distributions corresponding to new agents which are amplified by the merger. The means for emerging 5 select the agents that are the most in line with the feedback in order to converge them towards a more effective population of agents thus, improving the probability of detecting anomalies and the robustness of the monitoring.

Figure 3A:
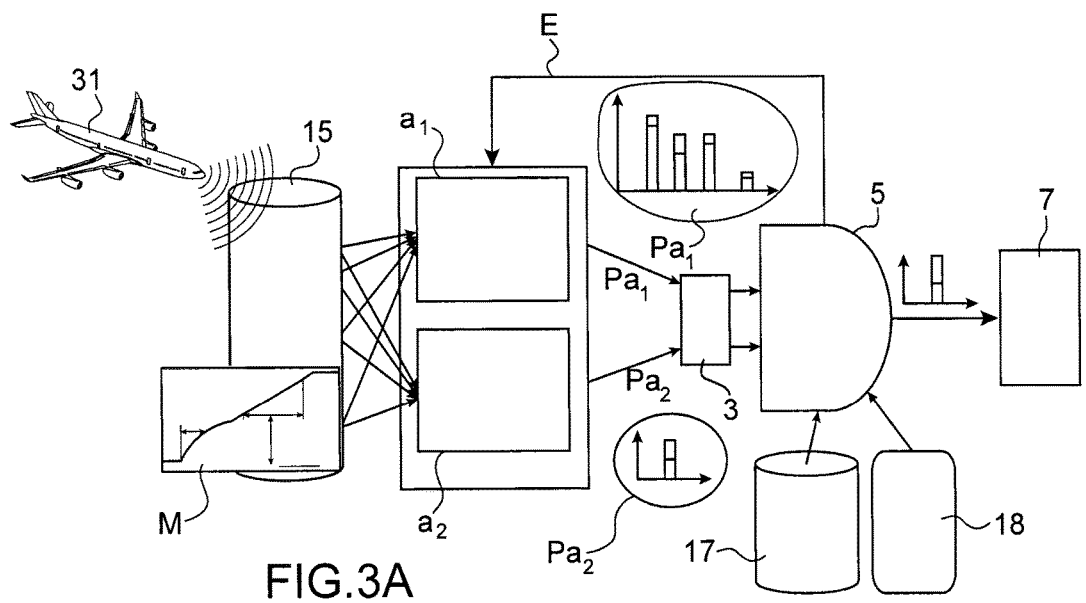
FIGS. 3A-3D diagrammatically show examples of merging in a system for monitoring a set of components of a device such as an aircraft engine, according to the invention.

The example of FIG. 3A relates to the monitoring of the starting capacity of an aircraft engine. According to this example, the means for detecting 2 comprise two agents for detecting an anomaly $a_1$, $a_2$. A first agent $a_1$ which analyses the measurements M in order to determine whether the engine can start and a second agent $a_2$ which evaluate the quality of the measurements M used by the first agent $a_1$. For example, this quality can depend on the proportion of values missing or on the number of aberrant data ("outliers").

The means for emerging 5 take as input a first distribution of the probability of an anomaly $P_{a_1}$ (i.e. a first risk of an anomaly $R_{a_1}$ and a first corresponding precision $\sigma_{a_1}$) evaluating whether or not the engine can start and a second distribution of the probability of an anomaly $P_{a_2}$ (i.e. a second risk of an anomaly $R_{a_2}$ and a corresponding second precision $\sigma_{a_2}$) linked to the quality of the measurements.

Furthermore, the means for emerging 5 also take as input expert rules 18 defining the merging principle as well as the feedback information 17 making it possible to measure the precision or the efficiency of the agents $a_1$, $a_2$ of which the results are used.

The means for emerging 5 merge the first $P_{a_1}$ and second $P_{a_2}$ distributions of the probability of an anomaly according to the expert rules 18 of merging in order to emerge current distributions of the probability of an anomaly that evaluate the capacity to start the engine and the effectiveness of the merger taking feedback information 17 into account. The current distributions of the probability of an anomaly are as such modulated using information coming both from the capacity to start and the various measurements that are used to evaluate this capacity to start.

The expert rules 17 for merging can for example act on the precision according to the risk of an anomaly linked to the quality of each measurement. For example, there can be a reduction rule of the "average" type in the following way: if the average of the risks of an anomaly linked to the quality of the measurements exceeds a first predetermined threshold M1, then the efficiency value decreases by a first value D1, and if the average of the risks of an anomaly linked to the quality of the measurements is between the first threshold M1 and a second predetermined threshold M2, then the efficiency value decreases by a second value D2, etc.

The means for emerging 5 then select the current distributions of the probability of an anomaly that has the best efficiency values in order to emerge agents that have a complete implication and that are highly linked to the capacity of starting the engine.

Figure 3B:
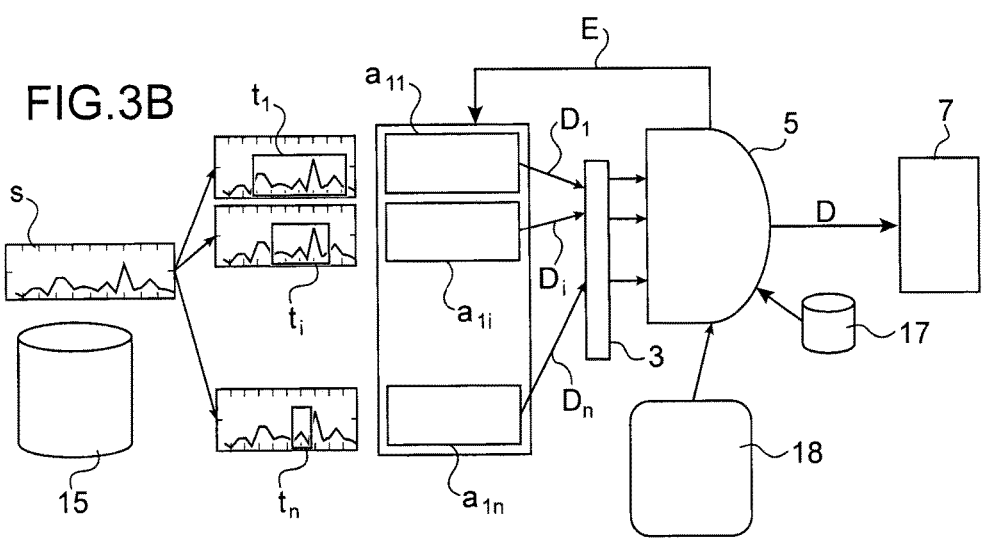

FIG. 3B shows an example wherein the same algorithm is applied to a time signal but at different instants.

The means for detecting comprise a set of agents $a_{11}, \ldots, a_{1i}, \ldots, a_{1n}$ that in reality corresponds to the same instance but with different configurations. All of the agents receive the same signal S and each agent determines the instant $t_i$ analysed in the signal. This makes it possible to diagnose the signal at different successive instants $t_1, \ldots t_i, \ldots, t_n$ in order to confirm an anomaly.

The set of agents $a_{11}, \ldots, a_{1i}, \ldots, a_{1n}$ generates a set of results $D_1, \ldots, D_i, \ldots, D_n$ corresponding to a set of configurations of the probability of an anomaly $P_{a_{11}}, \ldots, P_{a_{1i}}, \ldots, P_{a_{1n}}$.

The means for emerging 5 take as input the set of results $D_1, \ldots, D_i, \ldots, D_n$ as well as the expert rules 18 for merging and the feedback information 17. They apply an expert rule for merging the various results in order to measure a persistence that makes it possible to confirm a diagnostic. Using the feedback 17, the efficiency measured can adjust the expert rules or modify the configuration of the agents in order to optimise the result of the merge process.

By way of example, the expert rule for merging is formulated in such a way as to confirm a diagnosis for detecting an anomaly only if the sum of the detections is greater than a predetermined alert threshold A, according to the following formula:

$$Si \sum_{j=n-k+1}^{n} D(t_j) > A, \text{ alors } D = 1; \text{ sinon}, D = 0$$

where $D(t_i)$ is the result for detecting an anomaly of the agent $a_{1i}$ with the configuration of the instant $t_i$ and where D is the final result. This type of merger operates a confirmation of the detection while still reducing the rate of false alarms.

Figure 3C:
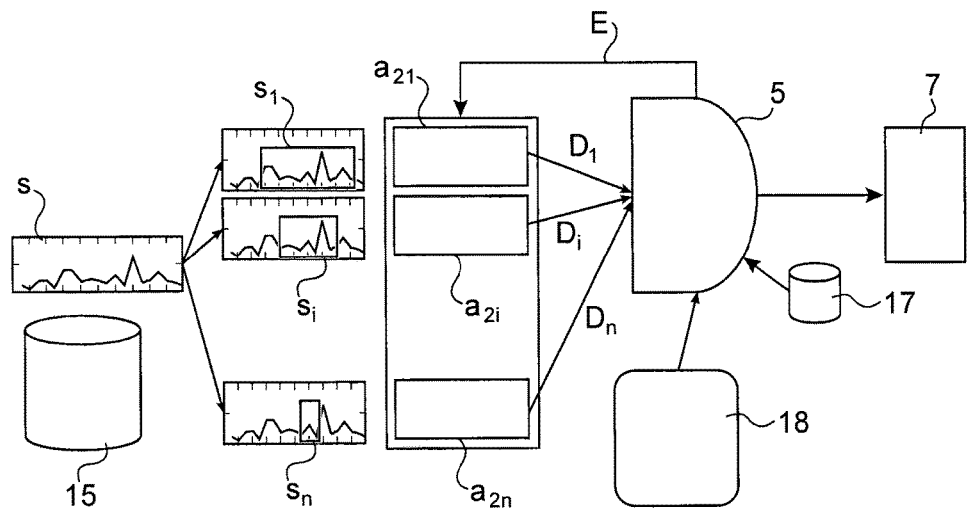

FIG. 3C shows another example similar to that of the example of FIG. 3B, except that in this example, the input signal S is analysed on different scales $s_1, \ldots, s_i, \ldots s_n$ and not at different instants.

The means for detecting 2 comprise a set of agents $a_{21}, \ldots, a_{2i}, \ldots, a_{2n}$ corresponding to the same instance but with different configurations. All of the agents receive the same signal S and each agent determines the scale $s_i$ or the window analysed in the signal. This makes it possible to diagnose the signal at different scales $s_1, \ldots, s_i, \ldots, s_n$ in order to confirm an anomaly.

The set of agents $a_{21}, \ldots, a_{2i}, \ldots, a_{2n}$ generates a set of results $D_1, \ldots, D_i, \ldots, D_n$ corresponding to a set of configurations of the probability of an anomaly $P_{a_{21}}, \ldots, P_{a_{2i}}, \ldots, P_{a_{2n}}$. The means for emerging 5 take as input the set of these results as well as the expert rules 18 for merging and the feedback information 17, and apply for example, the same expert rule described in reference to the example of FIG. 3B in order to merge the various results.

Figure 3D:
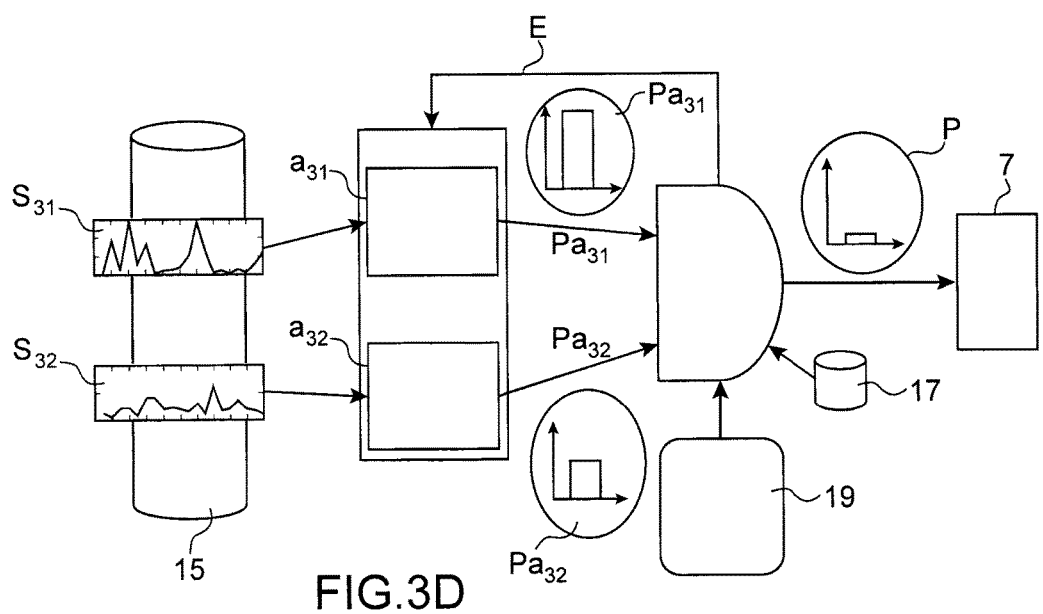

FIG. 3D shows an example where two different instances are applied. The means for detecting comprise first and second agents $a_{31}, a_{32}$ corresponding to two different instances and each agent takes as input a different signal $S_{31}, S_{32}$. The two agents deliver first and second distributions of the probability of an anomaly $P_{a_{31}}, P_{a_{32}}$.

The two distributions of the probability of an anomaly $P_{a_{31}}, P_{a_{32}}$ are merged by the means for emerging 5 according to a fuzzy rule which can be imposed from the outside by expert rules 18 or optimised automatically thanks to the feedback 17. At the end, a global distribution of the probability of an anomaly P in accordance with the feedback information emerges.

Moreover, the means for synthesis 7 of the system for monitoring 1 of each of the examples hereinabove synthesise the global or optimum distributions of the probability of an anomaly relating to a component or a sub-set of components of the engine in order to extract the risks of an anomaly that is specific to the latter. In the case of a sub-system of components of the engine, the optimum distributions of the probability of an anomaly relating to the sub-system of components are synthesised by weighting the influence of each component of this sub-system according to the corresponding implication vectors.

Note that all of the risks are calculated per engine over an entire fleet of engines and that it is naturally possible to have a global synthesis per aircraft. In this case, the list of faults to be monitored $\zeta$ correspond to all of the faults of all of the components of the engines of an aircraft. As such, all of the results of the calculations of risks on all of the engines can be capitalised by a global risk R. The faults $\zeta$ are as such linked to given engines $\zeta = \{f_{m_1}^{1}, f_{m_2}^{1}, \ldots, f_{m_1}^{2}, f_{m_2}^{2}, \ldots\}$ where $f_{m_i}^{j}$ shows the fault of type $f^j$ associated with the engine $m_i$.

Figure 4:
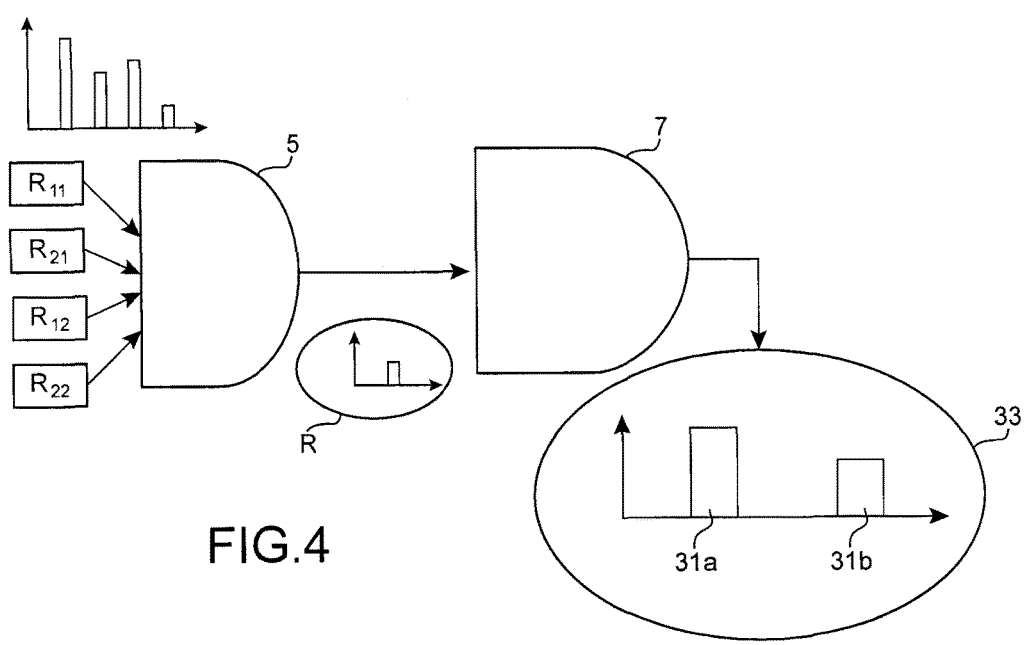
FIG. 4 diagrammatically shows a particular example of synthesis according to the system for monitoring of this invention.

FIG. 4 diagrammatically shows a particular example of synthesis according to the system for monitoring this invention.

According to this example, the synthesis can be seen as a visual data extraction tool "visual datamining" in that this synthesis consists in projecting the global risk of anomaly R coming from the means for emerging 5 on a sub-space of interest that makes it possible to have a view of the results. Here, the optimum distributions of probabilities of anomalies are synthesised by reduction techniques (for example, a regression method) by using different spaces (for example, aircraft, engine, test bench, dates, system, algorithm, observations, etc.) and the notion of implication making it possible to weight the influence of each optimum distribution of the probability of an anomaly.

For example in a one-dimensional sub-space, a ladder diagram can be obtained that has the risk of the anomaly for each variable considered. In the case where it is sought to detect breakdowns on several engines of different aircraft, and that it is desired to detect the aircraft that have a greater risk, then the optimum distribution of the probability of an anomaly issue of the merger is projected onto the space of the aircraft in order to view the risk of anomaly per aircraft.

More particularly, the example shown in FIG. 3 shows that the means for emerging 5 take as input first and second risks of an anomaly $R_{11}, R_{21}$ evaluating the risks of anomaly of the first and second engines of a first aircraft as well as the third and fourth risks of an anomaly $R_{12}, R_{22}$ evaluating the risks of an anomaly of the first and second engines of a second aircraft. The global risk R coming from the means for emerging 5 is projected by the means for synthesis 7 onto the space 33 of the aircraft in order to view the risk of an anomaly for each aircraft 31a and 31b.

The invention claimed is:

1. A system for monitoring a set of components of an aircraft engine, comprising:
   circuitry configured to:
   detect anomalies using a set of agents for detecting anomalies $(a_1, \ldots, a_i, \ldots a_n)$ with each one of said agents being configured to receive measurements on physical parameters relating to a sub-set of components of said aircraft engine and to deliver an initial distribution of a probability of an anomaly,
   receive feedback information as well as the initial distributions of the probability of an anomaly coming from said set of agents,
   iteratively emerge current distributions of the probability of an anomaly in line with said feedback information, with said current distributions of the probability of an anomaly converging towards a set of optimum distributions of the probability of an anomaly in accordance with said feedback information,
   synthesise optimal distributions of the probability of an anomaly relating to at least one sub-set of interest of components of said aircraft engine in order to extract risks of an anomaly specific to said sub-set of interest, and
   determine operations of maintenance according to the risks of an anomaly.

2. The system according to claim 1, wherein the circuitry is further configured to:
   create each current or optimum distribution of the probability of an anomaly by merging preceding distributions of the probability of an anomaly according to predetermined rules for merging,
   put into line each initial or current distribution of the probability of an anomaly with the feedback information that corresponds to the distribution of the probability of an anomaly, in order to associate an efficiency value to the distribution of the probability of an anomaly, and change the set of agents towards an optimum population of agents by creating new agents corresponding to current and optimum distributions of the probability of an anomaly and by selecting the agents that are the most compliant with the feedback information according to the efficiency values associated with said current and optimum distributions of the probability of an anomaly.

3. The system according to claim 1, wherein the circuitry is further configured to associate to each initial, current or optimum distribution of the probability of an anomaly relative to a sub-set of components of said device, an implication vector reflecting a contribution of each element of said sub-set on the corresponding distribution of the probability of an anomaly.

4. The system according to claim 3, wherein the circuitry is further configured to synthesise the optimum distributions of the probability of an anomaly relating to said sub-set of interest by weighting an influence of each element of said sub-set of interest according to the corresponding implication vectors.

5. The system according to claim 2, wherein the predefined rules for merging are chosen from among the following rules: expert rules, reduction rules, voting rule, business rules, Bayesian rules, and fuzzy logic rules.

6. The system according to claim 2, wherein the circuitry is further configured to adjust the merging rules according to the feedback information.

7. The system according to claim 2, wherein the set of agents or the optimum population of agents is formed by instances of algorithms comprising different choices of measurements, or different processing methods, or different configurations.

8. The system as claimed in claim 7, wherein the initial distributions of the probability of an anomaly are standardised with respect to a context of the measurements.

9. A method for monitoring a set of components of an aircraft engine, comprising:

acquiring feedback information as well as initial distributions of a probability of an anomaly coming from a set of agents for detecting anomalies, with each one of said agents being configured to receive measurements on physical parameters relating to a sub-set of components of said aircraft engine before delivering an initial distribution of the probability of an anomaly, iteratively emerging current distributions of the probability of an anomaly in line with said feedback information, with said current distributions of the probability of an anomaly converging towards a set of optimum distributions of the probability of an anomaly in accordance with said feedback information, synthesising optimum distributions of the probability of an anomaly relating to at least one sub-set of interest of components of said aircraft engine in order to extract risks of an anomaly specific to said sub-set of interest, and determining operations of maintenance according to the risks of an anomaly.

* * * * *

UNITED STATES PATENT AND TRADEMARK OFFICE
CERTIFICATE OF CORRECTION

| | |
|---|---|
| PATENT NO. | : 9,754,429 B2 |
| APPLICATION NO. | : 14/438129 |
| DATED | : September 5, 2017 |
| INVENTOR(S) | : Jerome Lacaille et al. |

Page 1 of 1

It is certified that error appears in the above-identified patent and that said Letters Patent is hereby corrected as shown below:

In the Specification

Column 7, Line 26, change "feedback information 16" to --feedback information 17--.

Signed and Sealed this
Twenty-eighth Day of May, 2019

Andrei Iancu
*Director of the United States Patent and Trademark Office*